United States Patent [19]

Scott

[11] Patent Number: 5,072,518

[45] Date of Patent: Dec. 17, 1991

[54] INSTALLATION HEAD FOR ATTACHING FEMALE FASTENERS

[75] Inventor: Raymond E. Scott, Frankfurt, Fed. Rep. of Germany

[73] Assignee: Multifastener Corporation, Detroit, Mich.

[21] Appl. No.: 457,060

[22] Filed: Dec. 26, 1989

Related U.S. Application Data

[60] Division of Ser. No. 271,123, Nov. 14, 1988, Pat. No. 4,893,394, which is a division of Ser. No. 111,966, Oct. 21, 1987, Pat. No. 4,831,698, which is a continuation-in-part of Ser. No. 69,804, Aug. 17, 1987, Pat. No. 4,810,143, which is a division of Ser. No. 869,507, Jun. 2, 1986, Pat. No. 4,700,470, which is a division of Ser. No. 657,570, Oct. 4, 1984, Pat. No. 4,610,072, which is a continuation-in-part of Ser. No. 563,833, Dec. 21, 1983, Pat. No. 4,555,838, which is a continuation-in-part of Ser. No. 504,074, Jun. 14, 1983, Pat. No. 4,543,701, and a continuation-in-part of Ser. No. 485,099, Mar. 28, 1983, Pat. No. 4,459,073, said Ser. No. 504,074, is a continuation of Ser. No. 229,274, Jan. 28, 1981, abandoned.

[51] Int. Cl.$^5$ .............................................. B21D 39/00
[52] U.S. Cl. .................................... 29/798; 29/243.521
[58] Field of Search .................... 29/432.1, 432, 432.2, 29/512, 243.52, 798, 243.53; 727/51, 55, 59

[56] References Cited

U.S. PATENT DOCUMENTS

| | | | |
|---|---|---|---|
| 4,543,701 | 10/1985 | Müller | 29/432.1 |
| 4,610,072 | 9/1986 | Müller | 29/432 X |
| 4,911,592 | 3/1990 | Müller | 29/432.1 X |

Primary Examiner—Timothy V. Eley
Attorney, Agent, or Firm—Dykema Gossett

[57] ABSTRACT

A method of attaching a female element having an annular riveting portion to a panel and the installation apparatus. The method includes driving a punch through the female element into a panel supported on a die member forming an unsupported cone-shaped panel portion in the cavity of the die member. The punch includes an axially extending piercing end which pierces a small opening in the cone-shaped panel portion and an arcuate drawing portion which is driven against and through the panel opening, enlarging the panel opening. The annular riveting portion of the female element is then driven into the cone-shaped panel portion and through the panel opening, drawing the panel portion into a tubular shape engaging the external surface of the riveting portion. Finally, the riveting portion is driven against a center post of the die member, radially outwardly deforming the free end of the riveting portion and forming a mechanical interlock with the tubular panel portion. In the preferred embodiment of the die member, the center post includes an axial bore and is spring biased through an opening in the bottom of the die cavity to receive the slug pierced from the panel by the punch. The center post is then resiliently biased downwardly to mate with the die cavity during radial deformation of the riveting portion of the female element.

11 Claims, 6 Drawing Sheets

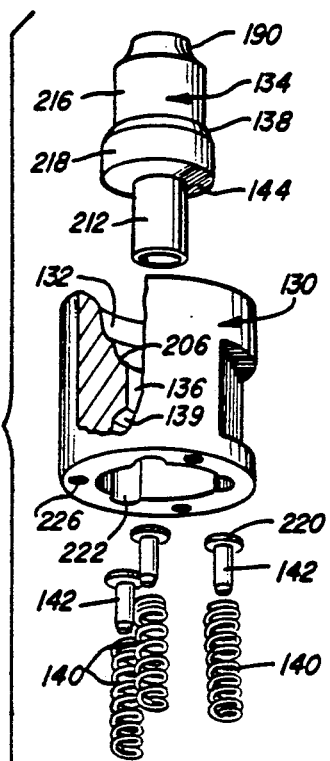
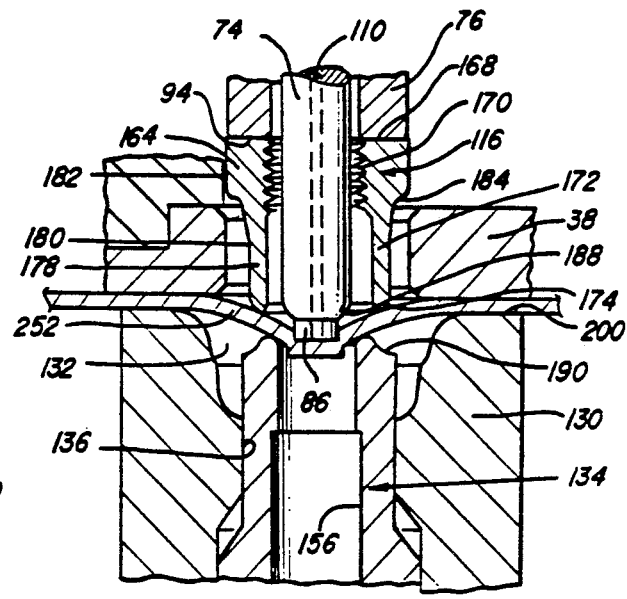
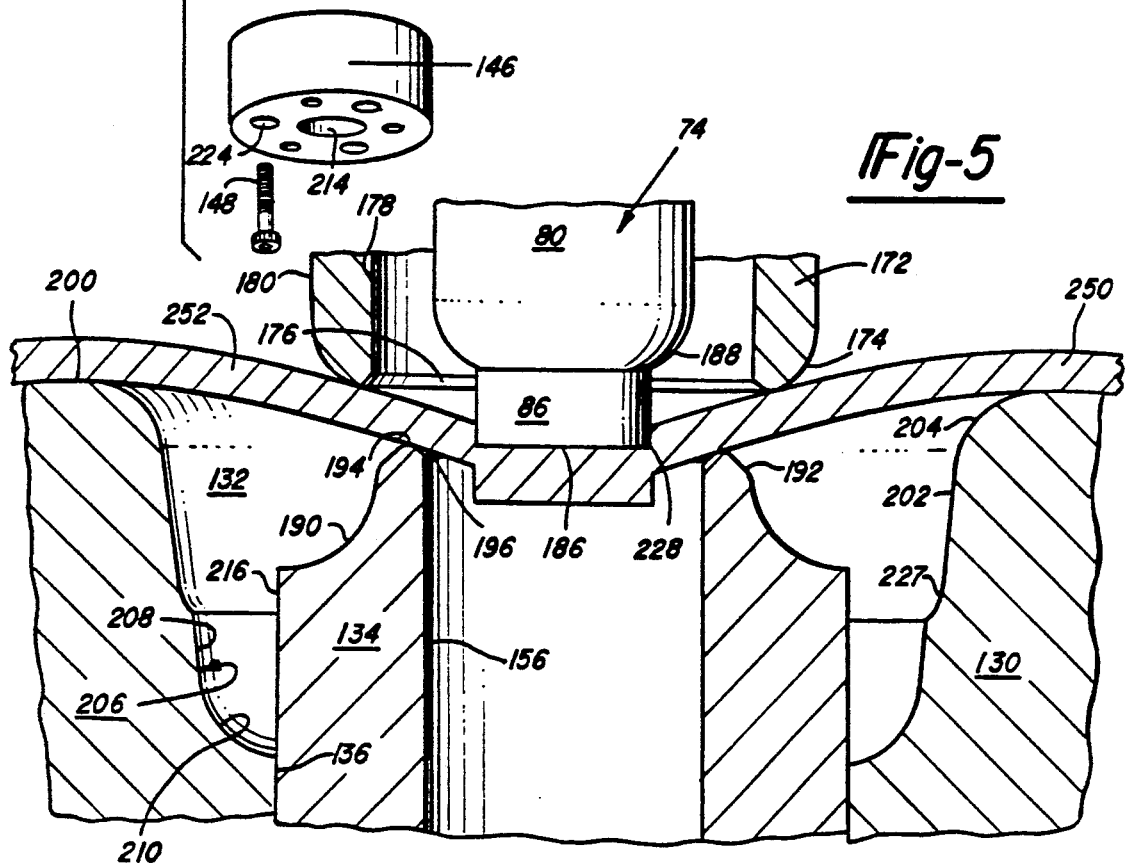

INSTALLATION HEAD FOR ATTACHING FEMALE FASTENERS

RELATED APPLICATIONS

This application is a divisional application of co-pending application Ser. No. 271,123, filed Nov. 14, 1988, now U.S. Pat. No. 4,893,394, which application was a divisional application of Ser. No. 111,966, filed Oct. 21, 1987, now U.S. Pat. No. 4,831,698, which application was a continuation in part application of Ser. No. 069,804, filed Aug. 17, 1987, now U.S. Pat. No. 4,810,143, which application was a divisional application of co-pending application Ser. No. 869,507 filed June 2, 1986, now U.S. Pat. No. 4,700,470, which application was a divisional application of Ser. No. 657,570 filed Oct. 4, 1984, now U.S. Pat. No. 4,610,072, which application was a continuation-in-part application of Ser. No. 563,833, filed Dec. 21, 1983, now U.S. Pat. No. 4,555,838, which application was a continuation-in-part application of Ser. No. 504,074, filed June 14, 1983, now U.S. Pat. No. 4,543,701 and Ser. No. 485,099, filed Mar. 28, 1983, now U.S. Pat. No. 4,459,073. Ser. No. 504,074 was a continuation of Ser. No. 229,274 filed Jan. 28, 1981, abandoned.

FIELD OF THE INVENTION

The present invention relates to installation apparatus and methods of attaching a female element, particularly female fastener elements such as nuts, to a panel, wherein the panel is pierced and the female element is installed in the pierced panel opening in a continuous operation.

The prior art includes self-piercing female elements, including nuts, which may also be simultaneously clinched to secure the nut in the pierced panel opening, such as disclosed in U.S. Pat. Nos. 3,299,500 and 3,314,138 assigned to the assignee of the instant application. The prior art also includes a number of self-riveting nuts including nuts having an annular skirt or barrel portion wherein the free end of the barrel portion is deformed radially outwardly in a die member to form a mechanical interlock with the panel, see for example U.S. Pat. Nos. 3,938,239 and 4,018,257. The self-riveting nuts disclosed in such patents are, however, secured to a panel having a prepierced panel opening requiring two separate operations. Such methods also require very precise centering of the nut relative to the prepierced panel opening, wherein a spring biased pin is received through the panel opening and the nut is centered on the pin prior to installation. U.S. Pat. No. 3,926,236, which is also assigned to the assignee of the instant application, discloses a method of attaching a nut wherein the panel is pierced by a punch which extends through the nut bore to pierce and secure the nut in a continuous operation, however, the fastener is not a riveting-type fastener having a barrel portion extending through the pierced panel opening. The prior art also includes a number of patents which disclose methods of attaching closures to a container such as a tag ring in a continuous operation, such as U.S. Pat. No. 3,800,401.

This application and the above-identified related patents and applications disclose methods and apparatus for attaching male and female elements to a panel, such as nuts and bolts, in a continuous operation. The preferred methods of installation do not require prepiercing of the panel, although the fasteners may be installed in a prepierced panel opening. Certain difficulties have, however, been experienced in installing a female element in a panel, particularly where the barrel portion of the female element is used to pierce the panel opening. The method of attaching a female element to a panel of this invention and installation apparatus is intended to solve the problems associated with the prior art and the previously disclosed methods and apparatus.

SUMMARY OF THE INVENTION

The method of attaching a female element to a panel of this invention solves the problems of installing a nut-type fastener in a continuous operation experienced with the methods previously disclosed in the above-identified related patent and permits installation of a nut-type fastener in a flush mounting, wherein the body portion of the fastener is flush with the panel. The female element includes a body portion having a bore therethrough and an integral barrel portion having a free open end coaxially aligned with the body portion. The method of this invention includes locating and aligning the female element opposite a panel preferably supported in fixed relation on a die member having a concave die cavity generally coaxially aligned with the female element with the barrel portion free end facing the panel. The free end of a punch is the driven through the female element into engagement with the panel. The free end of the punch which engages the panel includes an axially extending piercing end having a diameter which is substantially less than the internal diameter of the barrel portion followed by an enlarged convex drawing portion. As the punch is driven into the panel, it forms an unsupported generally cone-shaped panel portion into the die cavity. The piercing end of the punch then pierces a slug from generally the center of the unsupported cone-shaped panel portion, forming the small pierced panel opening. Finally, the drawing portion of the punch is driven against the panel, enlarging the panel opening and further driving the cone-shaped panel portion into the die cavity. The barrel portion of the female element is then driven into the cone-shaped panel portion and through the pierced panel opening into the die cavity, drawing the panel portion into a tubular shape. Finally, the barrel portion free end is deformed radially in the die cavity to form a mechanical interlock with the tubular panel portion.

Where a flush mounting of the female element in the panel is desired, the body portion of the female element is driven into the developing cone-shaped panel portion until it is flush with the adjacent surface of the panel. In the most preferred embodiment of the flush mounted assembly, the body portion includes a shoulder adjacent the barrel portion which faces the panel. The method then includes driving the shoulder of the female element into the panel portion which entraps the panel portion between the shoulder and the radially deformed barrel portion free end forming a very secure mechanical interlock which prevents withdrawal of the female element from the assembly. As will be understood, the formation of the panel adjacent the pierced panel opening is particularly important to the formation of a secure assembly. In the most preferred method of this invention, the free end of the barrel portion is biased against the cone-shaped panel portion during piercing of the panel under a predetermined load and the load is maintained as the punch is driven through the panel opening.

The preferred die member includes a separate projecting center post which is surrounded by the die cavity. The die post has an axial bore which is coaxially aligned with the piercing end of the punch. In the most preferred embodiment, the die post is spring biased toward the panel to receive the slug pierced from the panel, avoiding inadvertent ejection of the panel slug into the die cavity. As the panel is further deformed into the die cavity by the barrel portion of the nut, the die post is biased into the die cavity to receive the free end of the barrel portion of the nut to deform the barrel portion radially, as described. The die member includes a stop which generally aligns a concave radial die portion on the die post with the bottom surface of the die cavity, radially deforming the free end of the barrel portion into a preferred u or hook shape which receives the tubular panel portion. In the most preferred embodiment, the die surface of the post is located just above the mating surface of the die cavity to avoid locking.

The installation head of this invention, which receives the female elements for installation in a panel, includes a first passage which receives the female elements and a second plunger passage which communicates with the first passage. A punch reciprocates in the plunger passage having an outer surface and a free end. The punch free end preferably includes an integral generally cylindrically axially extending piercing portion and a transitional generally arcuate drawing surface which extends radially outwardly from the piercing portion and blends smoothly into the body portion of the punch. A plunger is telescopically disposed around the punch having a driving surface at its free end. As described, the punch free end is telescopically received through the female element bore and riveting portion to engage the panel. The actuating means of the installation head first drives the free end of the punch into piercing engagement with the panel, forming the cone-shaped portion, piercing a slug from the panel to form a pierced panel opening and driving the drawing surface against the panel, as described above. The plunger is then driven against the body portion of the female element, driving the riveting portion against the panel and through the pierced panel opening to install the panel by the method described.

The method and installation apparatus of this invention combines the advantages of the methods of attaching a female element to a panel and apparatus described in the above-identified related patents. First, the piercing of the panel with a punch, alone, rather than the punch in combination with the die button, eliminates the problem of forming a crescent-shaped slug which occasionally hung up to the die assembly. Further, the preformation of the panel into an unsupported generally cone-shaped portion accurately aligns the assembly prior to piercing. The piercing of a relatively small slug permits flush mounting of the female element in the panel. The formation of a tubular shape provides column strength preventing withdrawal of the female element from the assembly. Finally, the method of this invention permits installation of female elements in a panel on a production basis, such as required for automotive installations.

BRIEF DESCRIPTION OF THE DRAWINGS

FIG. 3 is an exploded partially cross-sectioned view of the die assembly shown in the lower portion of FIG. 1;

FIG. 4 is a side partially cross-sectioned view of a portion of FIG. 2;

FIG. 5 is an enlarged view of FIG. 4;

DESCRIPTION OF THE PREFERRED EMBODIMENTS OF THE INVENTION

Figure 1:
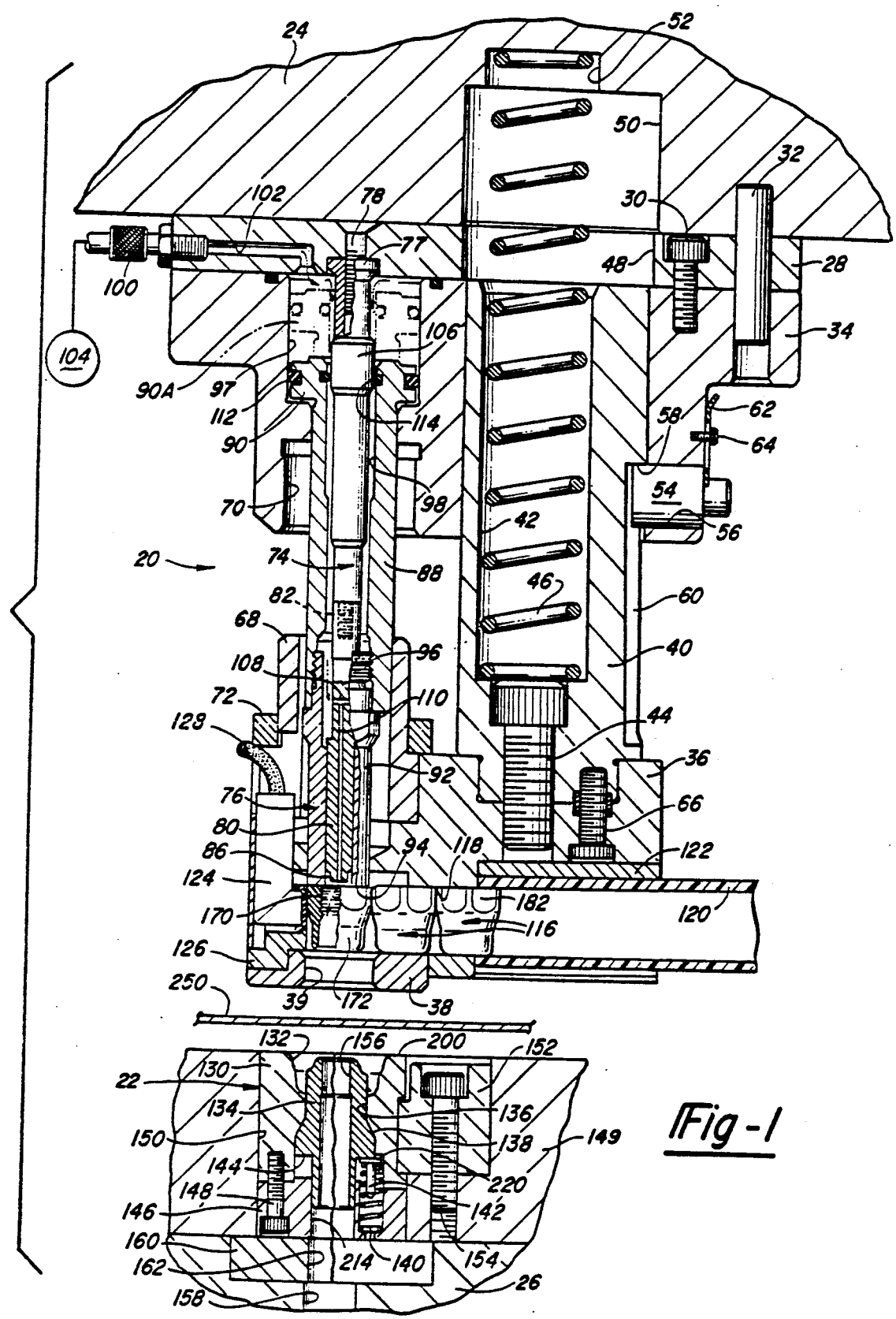
FIG. 1 is a side partially cross-sectioned view of an installation apparatus ready for installing a female element.

The method of installing a female element and installation apparatus of this invention is particularly, although not exclusively, adapted for die press installations, such as used by the automotive and appliance industries to form sheet metal. The method and apparatus of this invention is also particularly suitable for mass production, wherein a female element or a plurality of female elements are installed with each stroke of a die press in a continuous operation running over extended periods of time. As stated above, problems developed in installing female elements by the methods described in the above-referenced related patents in mass production. These problems resulted primarily because of the requirement for close tolerances and very accurate alignment of the barrel portion of the female element and the die member which cooperate to pierce an opening in the panel. In mass production, where close tolerances are difficult to maintain, crescent-shaped slugs were sometimes formed in addition to the intended circular slug, which could jam the installation apparatus. Further, a commercial method was not available for removing the panel slug.

The method and apparatus of this invention is particularly, although not exclusively adapted for flush mounting the female element in a panel, wherein the body portion of the nut is driven into the panel flush with the adjacent panel portion. Where the female element is a nut-type fastener having internal threads, the nut may then be used to attach the panel to a mating panel or structural element, eliminating the requirement for an embossment. The nut and panel assembly is particularly strong in resisting angular or perpendicular shear in a mating panel assembly or pull-out because of the column strength provided by the tubular shape drawn in the panel, in combination with the U or hook-shaped channel formed in the barrel portion of the fastener.

Although the female element may be attached to various types of plates or panels, the method and apparatus of this invention is particularly suited for installing a female element in a plastically deformable metal panel, such as used by the automotive and appliance industries for structural components. For example, the female element may be attached to relatively thin panels having a thickness of approximately 0.025 inches to relatively work panels having a thickness of about 0.10 inches or greater. The dimensions of the female element will, of course, depend upon the desired thread diameter, the thickness of the panel and the particular application. A female element, such as a self-riveting nut, may be formed of medium carbon steels, and installed in a wide variety of metal panels, including low and medium carbon steels.

Reference should also be made to the above-identified related patents and applications incorporated herein by reference which disclose further details of installations and installation apparatus. As will be understood, the method and installation apparatus of this invention is an improvement of the methods and apparatus previously described adapted for particular applications as disclosed herein.

Figure 2:
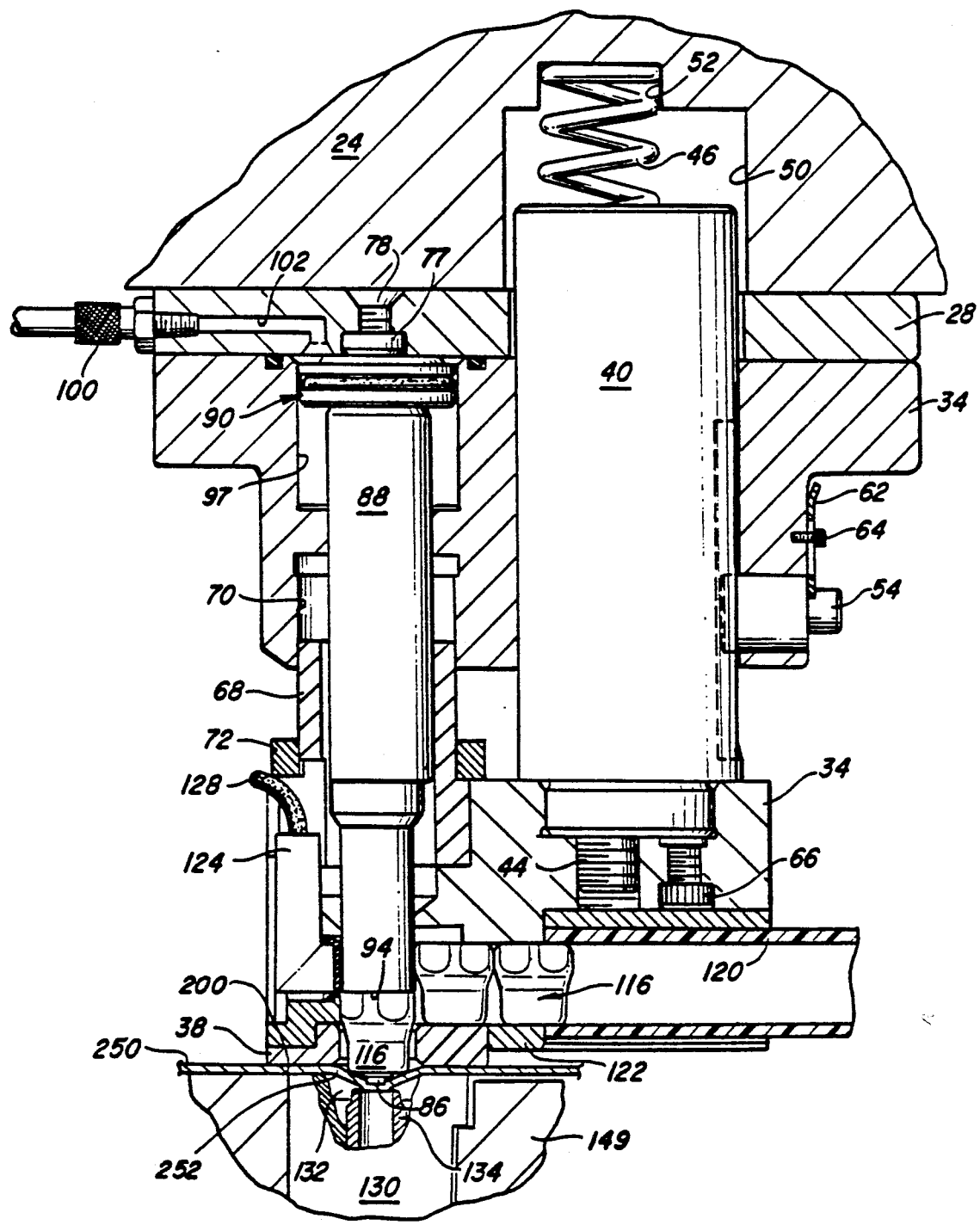
FIG. 2 is a side partially cross-sectioned view similar to FIG. 1 during the installation sequence.

Referring now to the drawings, particularly FIGS. 1 and 2 which illustrate one embodiment of an installation apparatus including a head assembly 20 and a die assembly 22. The head assembly 20 may be attached to an upper die shoe 24 of a die press and the die assembly 22 may be attached to a lower die shoe 26. As will be understood, "upper" and "lower" are relative terms assuming that the female elements are attached in a downstroke of the press. The method of this invention is not, however, limited to a system where the self-attaching elements are installed in a downward direction. The die assembly may for example be located in the upper die shoe and the head assembly may be located in the lower die shoe for upward installation of the self-attaching elements. The disclosed embodiment of the installation apparatus is particularly suitable for installing self-attaching elements in a die press such as used by the automotive and appliance industries to form the panel or plate in a contoured configuration, however, the method and installation apparatus of this invention are not limited to such applications.

In the disclosed embodiment of the installation apparatus, the head assembly 20 is attached to the upper die shoe 24 by bolts, not shown and hardened back-up plate 28 is provided as a load bearing member. The head assembly 20 is attached to the back-up plate 28 by a plurality of bolts 30 and alignment dowels 32 may be used to accurately position the installation head and back-up plate on the upper die shoe. The structural components of the housing assembly include the base housing 34, which is attached by bolts 30 to the back-up plate, the nose housing 36 and the nose piece 38 having an opening 39 for installation of the female elements. The nose piece 38 may be attached to the nose housing 36 by screws (not shown) or other suitable means.

As shown by comparing FIGS. 1 and 2, the nose housing 36 and nose piece 39 move relative to the base housing 34 during operation of the installation apparatus. This relative movement is guided by cylindrical guide shank 40 having an offset bore 42. Guide shank 40 is attached to the nose housing 36 by master bolt 44 and a coil spring 46 is received in the bore 42. The upper portion of the coil spring 46 is received through openings 48 and 50 in the back-up plate 28 and upper die shoe 24, respectively, and the upper end of the coil spring 46 is received in an alignment bore 52 in the upper die shoe. The powerful coil spring 46 thus urges the nose housing 36 away from the base housing 34 to the "open" position shown in FIG. 1. The nose housing 36 is retained on the base housing 34 by housing retaining pin 54 which is received through a bore 56 in the base housing 34 to engage a shoulder 58 on the guide shank 40. The end of the retaining pin 54 is received in a keyway slot 60 in the outer surface of the guide shank 40 to guide the relative movement of the assembly. A retainer clip 62, which is attached to the base housing 34 by a screw 64, prevents inadvertent removal of the housing retaining pin 54. An orienting bolt 66 accurately aligns the guide shank 40 on the nose housing 36.

In the disclosed embodiment, the nose housing 36 includes an antifriction bushing 68, such as a bronze bushing, which is received in a bore 70 in the base housing 34 and a stop block 72 retains the bushing 68 and limits relative upward movement of the nose member 36.

The operational components of the housing assembly 20 include a punch 74 and a plunger 76. The punch 74 includes an upper portion 77 which is attached to the back-up plate 28 by a screw 78. The punch 74 is thus fixed relative to the base housing 34. The punch 74 further includes a lower portion 80, which is attached to the upper position by a threaded shank 82 on the upper portion 77. As described more fully hereinbelow, the free end of the punch includes a piercing portion 86.

The plunger 76 may also be formed of two components, including an upper portion 88 having a piston head 90 and a lower portion 92 having a free driving end 94. In the disclosed embodiment, the upper end portion 88 of the plunger 76 is attached to the lower end portion 92 by a conventional threaded connection 96. As will be understood from the following description, the piercing portion 86 of the punch 74 is subject to wear and therefore must be periodically replaced during use. This can easily be accomplished in the disclosed embodiment of the invention by first threadably removing the lower portion 92 of the plunger, which provides access to the lower portion 80 of the punch. The lower portion 80 of the punch may then be threadably disconnected from the upper portion 77 and replaced.

As shown, the plunger 76 includes a configured axial bore 98 and the plunger is telescopically received on the punch 74. Further, the piston head 90 of the plunger 76 is free to reciprocate in the cylindrical bore 97 in the base housing 34. Thus, as described more fully hereinbelow, the plunger 76 will move relative to the base housing 34 as the nose housing 36 is "closed" relative to the base housing 34, as shown in phantom at 90A in FIG. 1. A pneumatic fitting 100 is attached to the back-up plate 28 which communicates with bore 97 through port 102. The pneumatic fitting 100 is attached to a source of line air pressure 104 maintaining a predetermined pressure in bore 97. When the piston head 90 moves past the enlarged portion 106 of the punch 74, air is received through the axial bore 98 in the plunger into cross port 108 in the lower end of the punch, periodically ejecting air through the axial bore 110 through the piercing end 86 of the punch to remove a slug pierced from the panel, as described hereinbelow. External and internal O-ring seals 112 and 114, respectively, are provided in the piston head 90.

As described, the installation head 20 is particularly adapted for attaching self-riveting elements 116 which are received through a passage 118 in the nose housing 36. The self-riveting elements 116 are delivered to the passage 118 by a guide chute 120. The guide chute 120 is attached to the nose housing 36 and nose piece 38 by chute attaching block 122 as described in the above-identified related patents.

In the disclosed embodiment, the head assembly includes a conventional proximity sensor 124 which is retained in the assembly by retainer 126 and the proximity sensor is connected to the control means for the system by line 128. The proximity sensor determines whether a self-riveting element 116 is in the installation ready position, as shown in FIG. 1. If a self-attaching element is not in the ready position, the press will not cycle thereby avoiding a double hit condition.

FIGS. 1, 3 and 5 best illustrate the die assembly 22. The die assembly includes a die member 130 having a cup-shaped die opening 132 and a center die post 134. The die post 134 is received through a central or axial opening 136 in the die member 130, and the die post and opening 136 include mating conical surfaces 138, 139 (see FIG. 3) which limit upward movement of the die post. The die post is spring biased upwardly by coil springs 140 each having pins 142 resiliently biased against a radial shoulder 144 of the die post 134. The shoulder 144 also limits downward movement of the die post. When the die post is biased downwardly during installation of the self-riveting elements, the shoulder 144 engages ring 146. Ring 146 is attached to the die member 130 by bolts 148 and the die member 130 is secured within an opening 150 in doe bittpm retaomer 149 by stop block 152 and bolt 154. The die button retainer is attached to the lower die shoe 26 by bolts, not shown. As described more fully hereinbelow, the center post 134 includes an axial bore 156 which receives the panel slugs and the lower die shoe includes a coaxially aligned bore 158. In the disclosed embodiment, the lower die shoe includes a back-up ring 160 having a bore 162 coaxially aligned with the bores 156 and 158.

Reference is now made specifically to FIGS. 3 to 5 which illustrate details of the preferred embodiment of the die set and assembly of this invention. The self-riveting elements 116 include a body portion 164 having a flat end 168 for engagement by the flat driving end 94 of the plunger 76. It will be understood that the end 94 of the plunger may be otherwise configured to mate with the end 168 of the self-riveting elements. The body portion 164 of the self-riveting element includes an axial bore 170, which in the disclosed embodiment is internally threaded, such that the self-riveting element serves as a nut-type fastener when attached to the panel, as described hereinbelow. The self-riveting elements further include an annular riveting or barrel portion 172 which is preferably integral with the body portion 164 and coaxially aligned with the bore 170. The free end of the annular riveting portion preferably includes an arcuate external surface 174, as best shown in FIG. 5, and a conical chamfer surface 176 which joins the arcuate surface 174 with the internal surface 178 of the annular riveting portion. The diameter of the external surface 180 of the barrel portion is preferably less than the diameter of the external surface 182 of the body portion 164 defining a radial arcuate shoulder 184 on the body portion, which is driven into the panel, as described below.

As best shown in FIG. 5, the piercing end 86 of the lower portion 80 of the punch 74 is preferably cylindrical having a flat end 186. The cylindrical piercing portion 86 is integral with the lower portion 80 of the punch 74 through a smooth arcuate convex drawing surface 188. The upper surface of the post 134 includes a concave arcuate die surface 190 spaced from the free end. The free end of the die post includes a conical exterior surface 192, a radial end surface 194 and a chamfer 196 in the opening to the axial bore 156.

The die member 130 includes a panel supporting surface 200 which surrounds cup-shaped die opening 132. The outer wall of the die opening includes a conical surface 202 which blends into the panel supporting surface 200 through a smooth arcuate surface 204. In the disclosed embodiment, the bottom surface 206 of the die cavity 132 is concave, including a generally conical upper surface 208 and a hemispherical surface 210 which generally mates with the concave die surface 190 of the die post 134 during radial deformation of the annular barrel or riveting portion 172 of the self-riveting element 116, as described below.

Further details of the disclosed embodiment of the die assembly are found in FIG. 3. The die post 134 includes a tubular end portion 212 which is closely received in the cylindrical opening 214 of the ring 146 (see also FIG. 1). The die post also includes a cylindrical external surface 216 which is closely received in the upper portion of the die bore 136 and a lower cylindrical surface 218 which is received in the lower cylindrical portion of the die bore. The pins 142 each include a head portion 220 which is biased against the shoulder 144 of the die post. The disclosed embodiment includes 3 pins 142 which are received in cylindrical channels 222 and three bolts 148 are received in bores 224 in the retainer ring 146 and threaded bores 226 in the die member 130. As shown in FIG. 1, the exterior surface 182 of the body portion of the disclosed embodiments of the self-riveting elements is hexagonal, preventing rotation of the self-riveting element in the panel following installation. The outer surface 202 of the die cavity 132 of die member 130 may also be configured to prevent rotation of the self-attaching elements in the panel. For example, the exterior surface 202 of the cavity may be hexagonal, defining a radial lip 227, as shown in FIG. 5.

Figure 6:
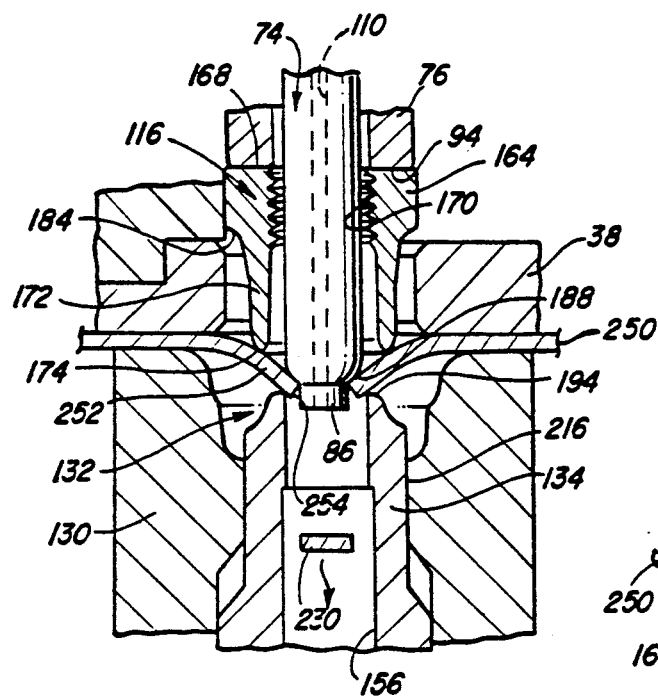
FIGS. 6 to 13 are partially cross-sectioned side elevations illustrating the sequence of installation of the female element using the installation apparatus shown in FIGS. 1 and 2.

Having described the elements of the installation apparatus and die set, including the self-attaching elements, it is now possible to describe the operation of the installation apparatus and the method of attaching the self-riveting elements of this invention. A female element 116 is first aligned opposite a panel 250 with the free end of the annular riveting or barrel portion 172 facing the panel and the barrel portion coaxially aligned with the die post 134 of the die assembly 22 in the installation ready position as shown in FIG. 1. The flat end 94 of the plunger 76 is coaxially aligned with the flat end 168 of the female element body portion and the punch 74 is coaxially aligned with the bore 170. In a conventional installation of the type disclosed herein, wherein the head 20 is attached to one die platen 24 and the die assembly 22 is attached to a second die platen 26, the method of this invention is performed simply by relatively closing the die press. As the die press is closed, the nose piece 38 engages the panel 250 which is then fixed on the panel supporting surface 200, as shown in FIG. 2. Further closing of the die press, causes relative movement of the base housing 34 of the installation head 20 toward the die assembly 22, causing the nose housing 36 to move toward the base housing 34, relatively "closing" the installation head 20. Because the punch 74 is fixed relative to the base housing 34, the punch is moved telescopically through the female element bore 170 and the annular barrel portion 172 to engage the panel as shown in FIGS. 4 and 5. The free end 94 of the plunger engages the end 168 of the body portion of the female element and moves the female element downwardly to engage the panel. However, the plunger is not fixed relative to the base housing 34. As the installation head 20 is relatively "closed", the piston head 90 of the plunger 76 is biased upwardly into bore 96 against the pneumatic pressure in line 102 and bore 97. The arcuate surface 174 of the barrel portion 172 of the female element is therefore biased against the panel under a predetermined load based upon the pneumatic pressure in bore 97. Continued movement of the installation head 20 toward the die assembly 22 drives the piercing end 86 of the punch against the unsupported panel portion 252 overlying the cup-shaped die cavity 132. As shown in FIG. 4, the main panel portion 250 is fixed between the nose piece 38 and the panel supporting surface 200 of the die member 130, however, the panel portion 252 overlying the die cavity 132 is unsupported because the die post 134 is telescopically movable downwardly into the die cavity against the relatively weak force of coil springs 140. As the punch is driven downwardly against the panel, the panel portion 252 is first driven into the die cavity 132 forming an unsupported generally cone-shaped panel portion 252 in the die cavity as shown in FIGS. 2, 4 and 5. The relatively sharp edge 228 of the piercing portion 86 of the punch 74 then pierces a circular slug 230 form the center of the conical panel portion 252, forming a circular opening 254, as shown in FIG. 6.

Figure 7:
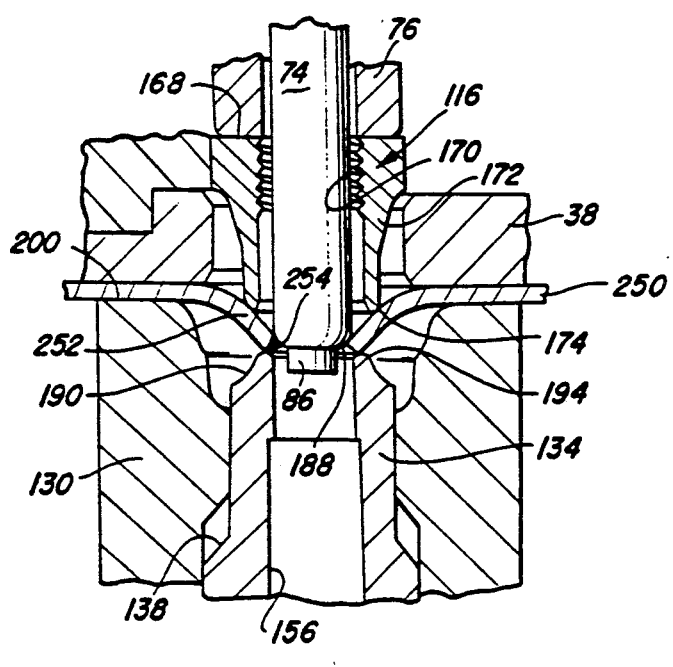

The piston head 90 of the plunger 76 is then located above the enlarged portion 106 of the punch 74, as shown in phantom at 90A in FIG. 1 and air is allowed to pass through the bore 98 in the plunger to inlet 108 in the punch, ejecting air through axial passage 110 through the piercing end 86 of the punch, as described above. The air pressure then ejects the slugs 230 into the bore 156 of the die post 134 when the post is engaging the panel, as shown in FIG. 6. In the preferred method of this invention, wherein the female element is mounted flush in the panel, the slug 230 is preferably relatively small. As best shown in FIG. 6, the free radial end 194 of the die post 134 is maintained in contact with the panel portion 252, assuring that the panel slug 230 is injected into the bore 156, and not into the die cavity 132, which would interfere with the installation of the female element. Following piercing of the panel, as shown in FIG. 6, the arcuate drawing surface 188 of the punch 74 is driven against the panel portion adjacent the opening 254, further drawing the panel into the die cavity 132 and enlarging the opening. As shown in FIG. 7, the drawing surface 188 is then driven, at least partially in the disclosed embodiment through the pierced panel opening 254, enlarging the panel opening and driving the conical portion 252 into the die cavity 132.

Figure 8:
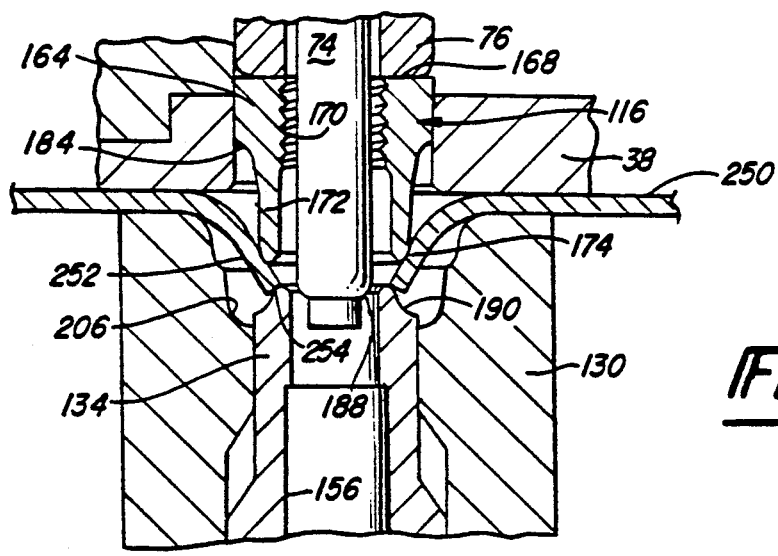
Figure 9:
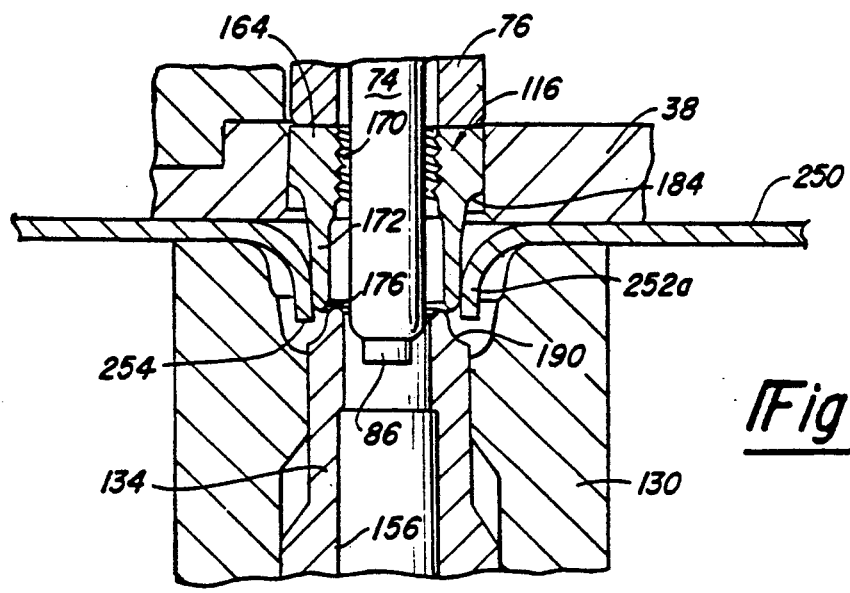

The piston head 90 then bottoms against back-up plate 28, as shown in FIG. 2. The plunger 76 is then "fixed" relative to the base housing 34, however, the stop block 72 has not yet bottomed against base housing 34. Thus, the nose housing 36 continues to move toward the base housing 34 as the die press is closed, driving the free end 94 of the plunger against the end 168 of the body portion of the female element 116. The free arcuate end 174 of the barrel portion 172 of the female element 116 is then driven into the panel portion as shown in FIG. 8, further enlarging the opening 254 in the panel portion 252. The barrel portion is then driven through the panel opening, as shown in FIG. 9, plastically deforming the panel portion into a tubular configuration 252a.

Figure 10:
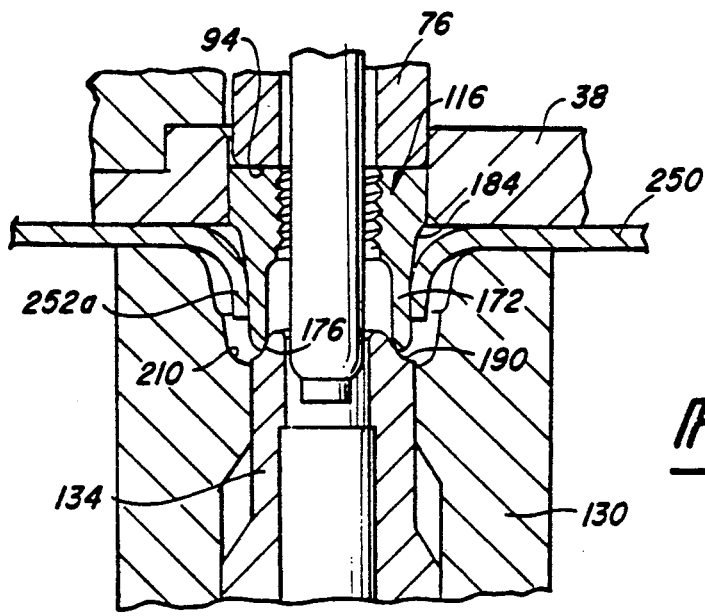

As shown in FIG. 10, the free end of the annular barrel portion 172 is then received through the tubular panel portion 252a and the chamfered surface 176 is received against the concave die surface 190 of the die post of deform the barrel portion radially outwardly, as described hereinbelow. It will be noted by comparing FIGS. 6 to 10 that the die post is continually urged downwardly first by the panel portion, as shown in FIGS. 6 to 8, and then by the chamfered surface 176 of the barrel portion, as shown in FIGS. 9 and 10, until the shoulder 144 of the die post engages the upper surface of the retainer ring 146 (see FIG. 1). When the die post bottoms against the retainer ring, the concave die surface 190 is preferably located a few thousandths of an inch above the mating hemispherical concave die surface 210 to avoid any binding of the free end of the annular barrel portion as it is deformed radially outwardly, as now described.

Figure 11:
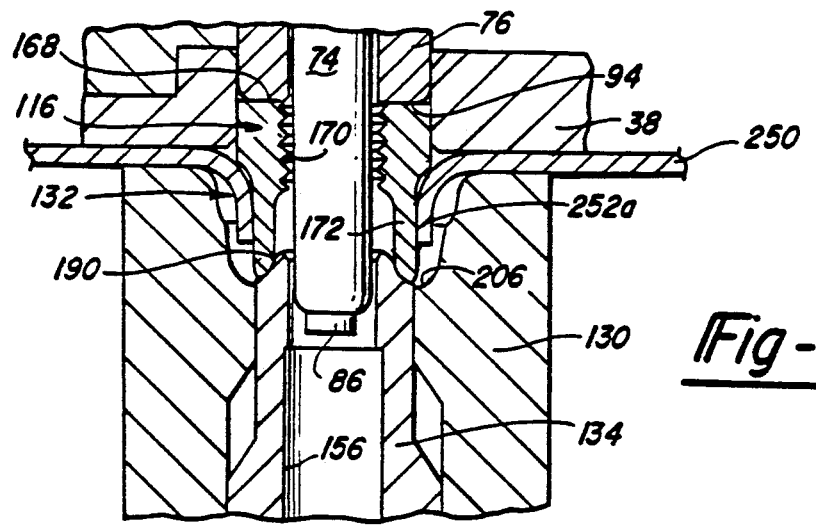
Figure 12:
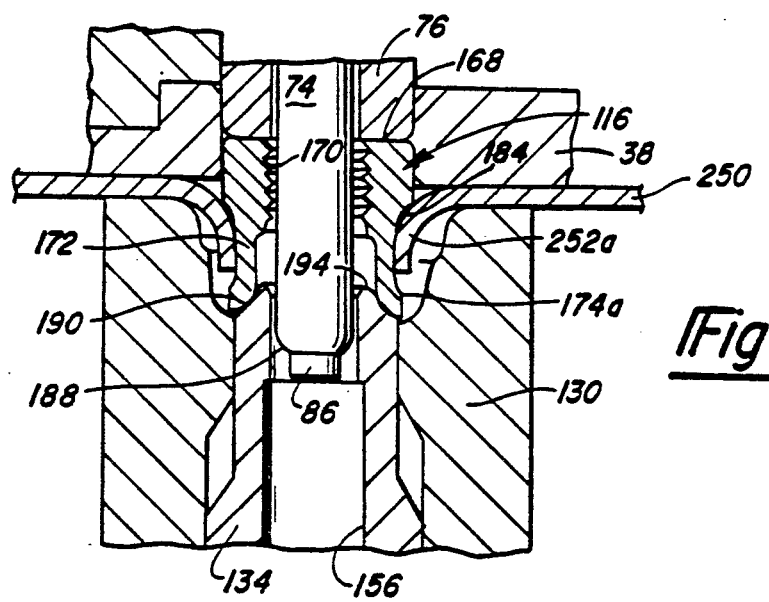
Figure 13:
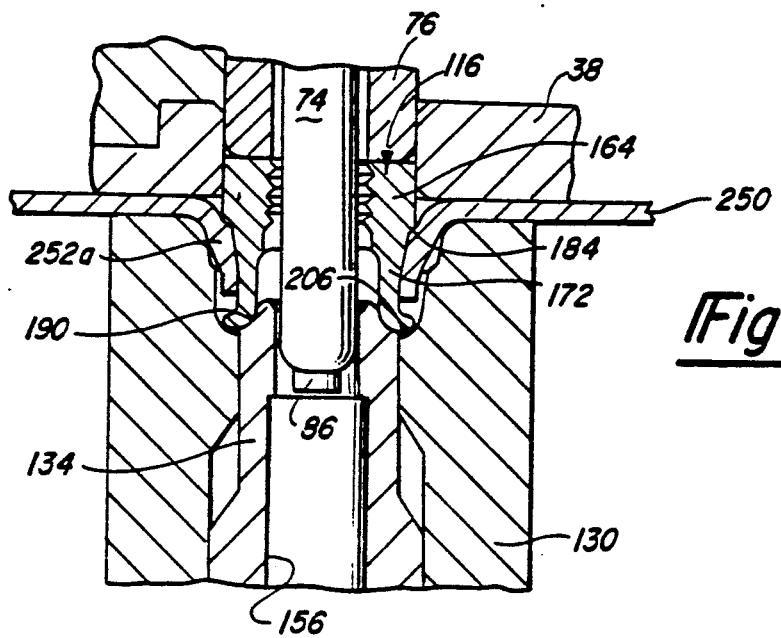

The free end of the barrel portion is then driven against the concave surface 190 of the die post 134, as shown in FIGS. 11 and 12, thickening the free end, as shown at 174a in FIG. 12, and beginning the radial outward deformation of the barrel portion. The arcuate shoulder 184 of the body portion 164 is then driven into the tubular panel portion 252a, driving the panel portion toward the free end 174a of the barrel portion and the free end of the barrel portion is simultaneously driven radially outwardly into the mating concave surface 206 of the die cavity, as shown in FIG. 13.

Figure 14:
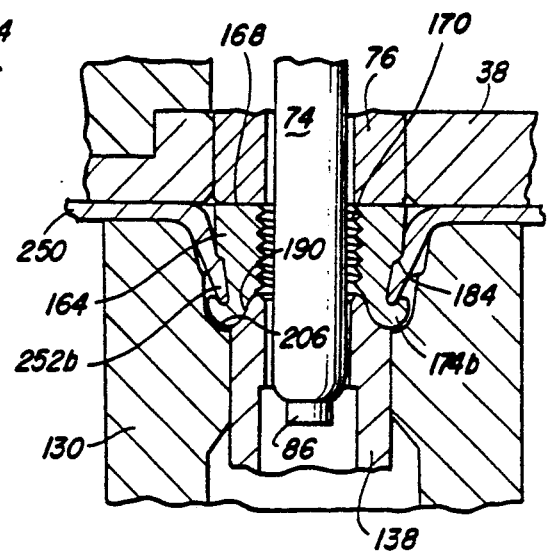
FIG. 14 is a partially cross-sectioned side elevation similar to FIGS. 6 to 12, following installation of the female element in a panel.

Finally, the free end 174a of the barrel portion 172 of the female element is deformed into a U or hook-shaped channel 174b and the panel portion 252b is driven into the hook-shaped portion and entrapped by the body portion shoulder 184 as shown in FIG. 14. The end surface 168 of the body portion 164 of the female element is now flush with the main portion 250 of the panel which is an important advantage of the method of installation of this invention. Thus, the female element and panel assembly may be used to clamp the panel 250 to another panel or structural element without embossing or recessing the female element. For example, a second panel or structural member may be clamped to panel 250, wherein the second panel overlies the end surface 168 of the female element. It should further be noted that the tubular panel portion 252b provides column and shear strength for the assembly. That is, if a bolt threaded into female thread 170, it will exert a force upwardly in FIG. 14 as the bolt is tightened. The hook shaped channel portion 174b will then be driven into tighter engagement with the tubular panel portion 252b and the column provided by the tubular panel portion will improve the strength of the assembly.

It will now be understood that the method of this invention is performed in a continuous operation and the method and apparatus of this invention are particularly suited for mass production, wherein female elements are installed in the panel with each stroke of the die press. After completing the installation, the die press is opened, as shown in FIG. 1, and the spring 46 extend the nose housing 36 to the position shown in FIG. 1. As described in the above-referenced related applications, a feed mechanism (not shown) continuously feeds female elements (116) to the ready position, preferably as the housing assembly 20 is opened, such that a female element is ready for installation as soon as the press is fully opened.

Briefly, the method of this invention then includes driving the piercing end 86 of the punch 74 through the female element body portion bore 170 and the annular barrel portion 172 into engagement with the panel 250. The punch then perform the following operations, generally in sequence: first, the punch free end drives the unsupported panel portion 252 in the die cavity 132, forming a generally cone-shaped panel portion 252 in the die cavity, as shown in FIGS. 4 and 5. The punch piercing end 86 then pierces a slug 230 from the center of the cone-shaped panel portion 252, forming a panel opening 254. The drawing surface 188 is then driven into the panel, adjacent the panel opening, enlarging the panel opening and further driving the panel portion into the die cavity. The drawing surface 188 may be driven at least partially through the panel opening 254, further enlarging the panel opening and driving the panel portion into the die cavity. The free end 174 of the female element barrel portion 172 is then driven into the cone-shaped panel portion 252 and through the panel opening, reforming the panel portion into a tubular shape 252a, as shown in FIG. 9. Finally, the free end of the barrel portion 172 is driven against the concave die surface 190 of the die post 134 radially outwardly into engagement with the generally mating concave surface 210 of the die cavity, forming a U or hook-shaped ring channel 174b on the barrel portion and forming a mechanical interlock with the panel portion 252b, as shown in FIG. 14. In the most preferred embodiment of the method of this invention, the shoulder 184 of the body portion is also driven into the panel portion 252b, entrapping the panel portion and mounting the upper surface 168 of the body portion flush with the main portion 250 of the panel.

As will now be understood, the deformation of the panel as described is very important to forming a secure mechanical interlock between the barrel portion 172 of the female element 116 and the panel portion 252b, as shown in FIG. 14. In the method of this invention, the deformation of the panel is very accurately controlled. Although the panel portion 252 is unsupported by the die assembly during piercing, the panel portion is controlled at all times. First, the free end 174 of the barrel portion is biased against the panel under a predetermined load which is maintained during piercing, controlling the formation of the cone-shaped panel portion 252a, as the panel is pierced. The panel is then received against the arcuate drawing surface 188, as shown in FIG. 6, forming a second ring contact with the barrel portion. The free end of the barrel portion is then driven into the panel portion 252, maintaining control of the panel deformation as the panel is drawn into a tubular shape.

As will be understood, various modifications may be made to the method and installation apparatus of this invention within the purview of the appended claims. As described above, the die post 134 is preferably spring biased upwardly to maintain the free end 194 in contact with the panel portion 252 to assure that the relatively small slug 230 is ejected into the die post bore 156. As will be understood, however, the means biasing the die post upwardly is not limited to a spring or a plurality of springs. The die post may be biased upwardly by pneumatic pressure, for example, or a resilient pad. As shown, the internal diameter of the inner surface 178 of the annular barrel portion 172 is over twice the diameter of the panel slug 230, providing sufficient metal for a flush mounting of the female element in the panel as shown in FIG. 14 and providing certain of the advantages of the method of this invention, including the column and shear strength provided by the tubular portion 252b. It will be understood, however, that the method of this invention may also be used where the diameter of the slug is more nearly equal to the internal diameter of the barrel portion 172. Further, the details of the commercial embodiment of an installation head 20 and die assembly 22 are disclosed herein as the best mode known to the Applicant for performing the method of this invention. It will be understood, however, that the method of the invention is not limited to the disclosed apparatus, particularly the detailed construction disclosed, and the improvements in the installation apparatus are not limited to the methods performed by the installation apparatus.

I claim:

1. An installation head for attaching a female element to a panel, said female element including a body portion having a bore therethrough and an integral riveting portion having an open free end communicating with said body portion bore, said installation head having a first passage receiving said female elements and a second plunger passage communicating with said flat passage, a punch reciprocal in said plunger passage including a body portion having an outer surface and a free end, said punch free end including an integral generally cylindrical axially extending piercing portion and a transitional generally arcuate drawing surface extending generally radially outwardly from said piercing portion and blending into said body portion outer surface, and a plunger telescopically disposed around said punch outer surface having a driving surface at its free end, said punch free end telescopically receivable through said female element bore and riveting portion to engage a panel located opposite said riveting portion free end, and said installation head including an actuating means for driving said punch piercing portion into piercing engagement with said panel, whereby when said punch piercing portion is driven into piercing engagement with said panel, a slug is pierced from said panel forming a pierced panel opening, whereby said actuating means is adapted for driving said drawing surface against said panel adjacent said pierced panel opening thereby enlarging said panel opening and driving said drawing surface through said panel opening, and said actuating means further adapted for driving said plunger driving surface against said female element body portion thereby driving said riveting portion through said enlarged panel opening.

2. The installation head defined in claim 1, characterized in that said transitional drawing surface of said punch including an arcuate surface adjacent said cylindrical piercing portion extending generally radially to the longitudinal axis of said punch, toward said body portion, and smoothly blending with said punch body portion outer surface.

3. The installation head defined in claim 1, characterized in that said punch includes an axial bore extending through said generally cylindrical piercing portion and said installation head including a pneumatic pressure means communicating with said punch bore and adapted to eject said panel slug from said punch piercing portion.

4. The installation apparatus defined in claim in combination with a die assembly, said assembly including a die member having a concave die cavity surrounding a projecting center die post having a free end, said die post telescopically received through a bore in said die member and said die post having an axial bore through said die post free end coaxially aligned with said punch free end and said punch free end telescopically receivable through said die post bore, said die member supporting a panel in fixed relation and said die post bore receiving said slug when said die post is located adjacent said panel and said die post cooperating said die member cavity to radially deform said female element riveting portion following piercing of said panel with said punch.

5. An installation head for attaching female riveting elements, said female riveting elements having an axial bore therethrough, said installation head including a first member and a relatively movable, spaceable second member, coaxially aligned plunger passages in said first and second members, a plunger telescopically supported in said plunger passages, said plunger having a head portion telescopically receivable in a fluid chamber in said first member and an opposite free end telescopically received in said second member plunger passage, said plunger having an axial bore therethrough, a punch having an axial length greater than the axial length of said plunger telescopically receiving said plunger bore and said punch having one end adjacent said plunger head fixed relative to said first member and a free opposite end telescopically receivable through said plunger free end, and fluid pressure means supplying fluid under pressure to said pressure chamber against said plunger head normally biasing said plunger in said second member plunger passage to engage a riveting element engaged therein upon relative closing of said first and second members and said punch telescopically receiveable through said female riveting elements upon closing of said members.

6. The installation head defined in claim 5, including a spring means normally spacing said first and second members and, upon relative closing said first and second members against the force of said spring means, said punch free end being driven through said member plunger passage and riveting element to pierce a workpiece located opposite said passage to receive a riveting element driven by said plunger.

7. The installation head defined in claim 6, wherein said punch free end includes an integral, generally cylindrically, axially extending piercing portion, a transitional, generally arcuate drawing surface extending generally radially outwardly from said cylindrical piercing portion and blending into a generally cylindrical body portion having a diameter greater than the diameter of said cylindrical piercing portion.

8. The installation head defined in claim 5, wherein said plunger head portion comprises an enlarged piston head including sealing means surrounding said piston head, said first member fluid chamber having an inside wall configured to receive said piston head in sealing relation and said fluid pressure means supplying air under pressure to said fluid chamber.

9. The installation head defined in claim 8, wherein said punch free end includes an axial air passage communicating with said fluid chamber directing air under pressure through said punch free end.

10. An installation head for attaching female riveting elements to a panel, said installation head including a first member and a relatively movable, spaceable second member, spring means normally separating said first and second members, coaxially aligned plunger passages in said first and second members, a plunger telescopically supported in said plunger passages, said plunger having an enlarged head portion and said first member having a fluid chamber telescopically receiving said plunger head portion and said plunger having an opposite free end telescopically received in said second member plunger passage, said plunger having an axial bore therethrough, a punch having an axial length greater than the axial length of said plunger telescopically received in said plunger bore, said punch having one end extending through said plunger and said fluid chamber fixed relative to said first member and a free opposite end telescopically receivable through said plunger free end, fluid pressure means supplying fluid under pressure to said pressure chamber against said plunger head, thereby telescopically biasing said plunger in said second member plunger passage, and said second member including a riveting element passage intersecting said plunger passage for feeding said riveting elements into said plunger passage opposite said plunger, said riveting elements including a bore therethrough receiving said punch free end and said plunger free end configured to engage said riveting element, said actuating head further including an actuating means for closing said first and second members, thereby first extending said plunger through said second member plunger passage to engage a riveting element and secondly, driving said riveting element into said workpiece under a predetermined load proportional to the pressure in said pressure chamber, and means for driving said punch through said riveting element bore into said workpiece to pierce an opening in said workpiece to receive said riveting element.

11. An installation head as defined in claim 10, wherein said punch free end includes a generally cylindrical, axially-extending piercing portion, a transitional, generally arcuate drawing surface extending generally radially outwardly from said piercing portion and a body portion having a diameter substantially greater than said cylindrical piercing portion.

* * * * *

UNITED STATES PATENT AND TRADEMARK OFFICE
CERTIFICATE OF CORRECTION

PATENT NO. : 5,072,518
DATED : 12/17/91
INVENTOR(S) : Rudolf R.M. Muller

It is certified that error appears in the above-indentified patent and that said Letters Patent is hereby corrected as shown below:

On the title page: Item [75] Inventor:

```
Please change"Applicant(s): RAYMOND E. SCOTT" to
--Applicant(s): RUDOLF R.M. MULLER--
```

Signed and Sealed this

Twenty-ninth Day of June, 1993

Attest:

MICHAEL K. KIRK

*Attesting Officer*     *Acting Commissioner of Patents and Trademarks*